United States Patent Office 3,509,214
Patented Apr. 28, 1970

3,509,214
OIL SOLUBLE OXIDIZED NAPHTHYLAMINE COMPOSITIONS
Milton Braid, Barrington, and Derek A. Law, Pitman, N.J., assignors to Mobil Oil Corporation, a corporation of New York
No Drawing. Filed Mar. 28, 1966, Ser. No. 537,639
Int. Cl. C07c 87/66; B01j 1/16
U.S. Cl. 260—576    12 Claims

ABSTRACT OF THE DISCLOSURE

The invention provides oil-soluble products made by heating N-phenyl-naphthylamine, N-naphthyl-naphthylamine, mixtures thereof, or mixture thereof with diphenylamine, in the presence of an oxidizing agent. The products impart improved antioxidant properties to oil compositions.

This invention relates to organic compositions possessing improved resistance to breakdown by oxidation and particularly it relates to lubricant compositions having improved oxidation stability.

It is well-known that many organic liquids and solids used in industrial applications, such as oils and greases, power transmission fluids, resin and polymer coatings, insulations, structural products and the like, may deteriorate and lose their ability to function when subjected to oxidation. Since these substances are very often utilized at high temperatures, the rate of oxidation breakdown can be very rapid. This problem is particularly important in the operation of modern day automotive and aircraft engines. The breakdown of the lubricating oil, either natural or synthetic, is frequently accompanied by the formation of corrosive acids, sludge and other products of such breakdown. These resulting products can harm the metal surfaces of the engine and interfere with the efficient operation of the lubricants.

It is a major object of this invention to provide novel organic compositions having improved oxidation stability. A further object is to provide novel lubricant compositions. Another object is to provide novel additives for synthetic lubricant compositions. These and other objects will be more apparent from the following description.

It has now been discovered that the stability of base organic liquids normally susceptible to oxidative deterioration may be unexpectedly improved by the addition thereto of a minor proportion effective to protect the organic liquids against oxidative deterioration of an N-arylnaphthylamine-containing polymer produced by subjecting the said N-arylnaphthylamine or a mixture of the said N-arylnaphthylamine with a diphenylamine or with a second N-arylnaphthylamine to either a thermal or chemical oxidation step, or both.

The reactants used in this invention include the aromatic secondary naphthylamines, or N-arylnaphthylamines, of the formula

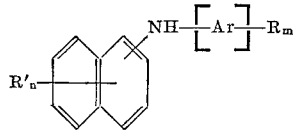

wherein Ar is phenyl or naphthyl (or, if substituted, phenylene or naphthylene), R and R' are each alkyl, aralkyl, aryl, alkaryl, alkoxy, or aryloxy, having from 1 to about 20 carbon atoms in each group, and the R groups may be the same or different, and $m$ and $n$ are from 0 to any number sufficient to complete the available positions on the aromatic nuclei without hindering the formation of the polymer. The above compound may be reacted with itself or with a diphenylamine having the formula

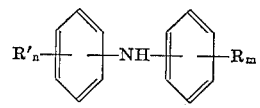

R, R', $m$, and $n$ having the same identification as above. Thus, the N-arylnaphthylamine structure is always in the polymer molecule.

The novel reaction products produced by the coupling or cross-coupling depending upon the reactants used in accordance with this invention are not all subject to definite identification. It is theorized that the bonding may occur between two nitrogen atoms, between a nitrogen atom in one naphthylamine and a carbon atom in a second naphthyl or other aryl radical, or between carbon atoms in two naphthyl or aryl radicals. The various structures illustrating this invention, but not limiting thereto, are believed to have the following forms when the above types of bonding occur between two moles of N-arylnaphthylamine:

I

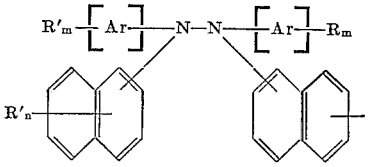

II

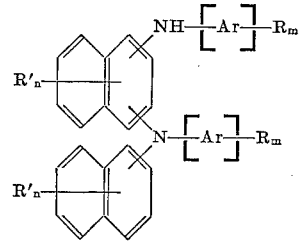

III

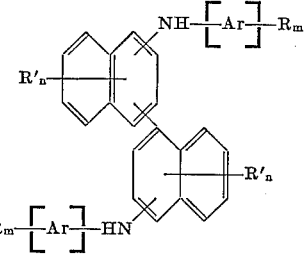

Ar, R, R', m and n having the above-described definitions. When one of the reactants is diphenylamine, the following co-oxidized products may be obtained.

I'
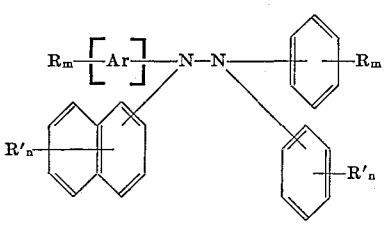

II'
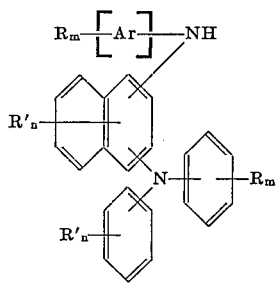

III'
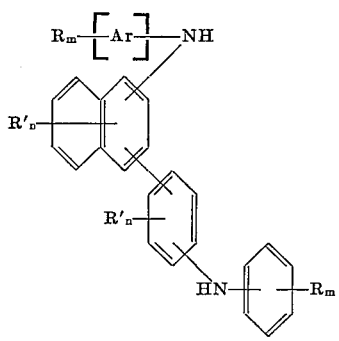

The co-oxidation reaction may also involve bonding in the Ar radical.

The co-oxidation treatment of the naphthylamines or of naphthylamines with other diarylamines may result in a reaction mixture of products in which dimers, trimers and tetramers of this invention are predominant constituents. However, there is no minimum concentration of such polymers for attaining the desired improvements, since the mixture is believed to contain also unreacted N-arylnaphthylamine or diphenylamine and various side products. Nonetheless, it has been found that the presence of these large molecular substances provide excellent antioxidant stability to organic substances, such as fluid lubricants, regardless of the concentration of the polymers or what the structure of the polymers may be. The improvement in stabilization results can be attributed solely to the mere formation of the polymeric materials.

Broadly, the reaction may be conducted in bulk or solution by simply heating the N-arylnaphthylamine or the N-arylnaphthylamine and the diphenylamine at a temperature in the range of 150° to 300° C. and preferably from about 200° to about 275° C. The N-arylnaphthylamine may be dissolved in a suitable inert organic solvent, such as an aromatic hydrocarbon, ketone or the like. A stream of air or oxygen is circulated through the liquid mixture during the heating stage. This heating step is conducted for a period of from about 30 minutes to about 80 hours. The time, of course, may vary depending upon the degree of polymerization desired.

Alternatively, oxidation may be performed using a chemical reagent. The reaction mass is treated with an oxidizing agent, such as potassium permanganate, lead dioxide, manganese dioxide, hydrogen peroxide, alkyl and aryl peroxides, and per-acids. These oxidations may be performed at any suitable temperature using known techniques. The residue from the oxidizing agent is removed; if necessary, filtration may be used, and the filtrate is stripped of solvent as the final purification step.

It has been discovered in accordance with this invention that the polymeric compounds provide excellent stabilizing properties to organic substances, particularly to lubricating oils and greases wherein the base medium is a hydrocarbon or synthetic lubricant. The preferred base fluids according to this invention include hydrocarbon mineral oils, olefin fluids, polyolefin fluids, polyether fluids, polyacetals, alkylene oxide polymers, silicone-base fluids, and ester fluids. The esters of dicarboxylic acids and monohydric alcohols and the trimethylol propane and pentaerythritol esters of monocarboxylic acids are especially of interest. Suitable diesters include esters of oxalic, malonic, succinic, glutaric, adipic, pimelic, suberic, azelaic, and sebacic acids, cyclohexane dicarboxylic acid, phthalic acid, terephthalic acid, and the like, and alcohols having from 1 to about 20 carbon atoms. A commonly used diester is di(2-ethylhexyl) sebacate.

The acids used in forming the trimethylol propane and pentaerythritol esters include those containing from about 1 to about 30 carbon atoms, having straight and branched-chain aliphatic, cycloaliphatic, aromatic and alkylated aromatic structures. Mixtures of one or more of such acids may also be used in the preparation of these tri- and tetra-esters. Typical carboxylic acids include acetic, propionic, butyric, valeric, iso-valeric, caproic, caprylic, pelargonic, capric, isodecanoic, lauric, and benzoic, nonylbenzoic, dodecylbenzoic, naphthoic, cyclohexane carboxylic acids and the like. The acids most particularly preferred are pelargonic acid and commercial valeric acid, which contains both n-valeric and iso-valeric acids. The most preferred ester used in this invention is an ester prepared from pentaerythritol, pelargonic acid, n-valeric acid, and iso-valeric acid.

We find that the polymeric compounds of this invention are sufficiently soluble in these synthetic oils to obtain satisfactory stabilizing effect. Suitable concentrations range from about 0.001% to about 10% by weight of total lubricant composition of the additive, preferably from about 0.1% to about 5%. The following specific examples illustrate the various aspects of this invention without limiting it. All parts and percents are on a weight basis unless otherwise specified.

EXAMPLE 1

Into a suitable reactor was added 60 grams of N-phenyl-1-naphthylamine and stirred at 230° C. for 2 hours in air. The resulting product was a dark viscous oil. Upon cooling, this product was analyzed by low voltage mass spectroscopy. Analysis showed:

|  | Percent |
|---|---|
| Unreacted | 93.4 |
| Dinaphthylamine | 2.5 |
| Dimer of reactant having a mass of 436 | 3.9 |

The N-phenyl-1-naphthylamine reactant contained from 2% to 3% dinaphthylamine according to mass spectroscopic analysis.

EXAMPLE 2

N-phenyl-1-naphthylamine was heated at 225° to 230° C. for 72 hours, during which time a slow subsurface stream of air was passed through the liquid reactant. The analysis of the resulting crude product was:

|  | Percent |
|---|---|
| Unreacted | 73.4 |
| Dimer | 19.6 |
| Trimer | 0.9 |
| Dinaphthylamine | 1.8 |
| A product of mass 487 | 1 |

The mass 487 product corresponded to an expected coupling between the N-aryl-naphthylamine and dinaphthylamine.

EXAMPLE 3

As in Example 2, 700 grams of N-phenyl-1-naphthylamine (also hereinafter termed "PAN") was heated with a subsurface stream of oxygen passing through the reactant at a temperature of 240° to 250° C. To determine the rate of reaction, periodic analysis was conducted. The mass spectral data were as follows:

|  | (a) | (b) | (c) |
|---|---|---|---|
| Time, hrs | 1.0 | 2.0 | 3.5 |
| Products: |  |  |  |
| Unreacted | 80.1 | 70.3 | 62.7 |
| Dimer | 15.0 | 24.4 | 32.2 |
| Trimer | 0.2 | 0.4 | 0.7 |
| Dinapthylamine | 1.7 | 1.7 | 1.3 |
| PAN-dinaphthylamine product | 0.8 | 1.1 | 1.3 |

EXAMPLE 4

A solution of 55 grams (0.25 mole) of N-phenyl-1-naphthylamine in purified acetone was prepared and cooled to a temperature of below 0° C. To this solution was added 13.2 grams (0.0835 mole) of potassium permaganate. The mixture was stirred for three hours, then the cooling medium was removed and the mixture was stirred for 100 hours at 25° C. The resulting brown suspension was filtered and the filtrate was stripped to 70° C. at 1 mm. Hg. leaving a red-brown grease. By mass spectroscopic analysis the grease was determined to contain the following:

|  | Percent |
|---|---|
| Unreacted | 78.3 |
| Dimer | 21.3 |
| Trimer | 0.4 |

EXAMPLE 5

To a 2-liter solution of acetone containing 250 grams (1.14 moles) of N-phenyl-1-naphthylamine was added 63 grams (0.40 mole) of potassium permanganate. The addition was made over a period of 4½ hours at a temperature of from 0° to 3° C. When the addition was complete the temperature was allowed to increase, the mixture being stirred at 25° C. for another 40 hours. The mixture was thereafter filtered and the filtrate stripped to 90° C. at 0.2 mm. Hg. A dark brown grease (241 grams) was removed as the final product. Analysis of this product was as follows:

|  | Percent |
|---|---|
| Unreacted | 48.4 |
| Dimer | 42.3 |
| Trimer | 0.2 |
| Product of mass 434 | 4.1 |

The product of mass 434, although unidentified, may be substantially that of the dimer since its molecular weight is only 2 units less than the dimer.

EXAMPLE 6

Using the procedure of Example 3, 100 grams of N-phenyl-2-naphthylamine (also termed hereinafter "PBN") was heated at 245° C. for 2 hours. The resulting black tar contained as the major component the following:

|  | Percent |
|---|---|
| Unreacted | 66 |
| Dimer | 20 |
| Trimer | 1.2 |

EXAMPLE 7

Using the procedure of Example 4, N-phenyl-2-naphthylamine was substituted for the N-phenyl-1-naphthylamine. A dark brown grease-like product resulted. The analysis was as follows:

|  | Percent |
|---|---|
| Unreacted | 43 |
| Dimer and substance of mass 434 | 54 |
| Trimer | 0.6 |
| Substance of mass 343-344 | 2.3 |

EXAMPLE 8

Following the conditions of Example 5, N-phenyl-2-naphthylamine was treated with potassium permanganate, yielding 220 grams of product. The analysis of this product was as follows:

|  | Percent |
|---|---|
| Unreacted | 17.8 |
| Dimer | 56 |
| Product of mass 434 | 10.9 |
| Product of mass 343 | 9.3 |
| Trimer | 0.8 |

The crude product was dissolved in ether and cooled depositing thereby essentially 71.8 grams of almost colorless needles. Recrystallization removed the slight tint. The melting point of the recrystallized product is 162.5 to 164° C.

*Analysis.*—Calc'd for $C_{32}H_{24}N_2$ (percent): C, 88.04; N, 6.42; H, 5.54. Found (percent): C, 88.13; N, 6.37; H, 5.51. Calc'd molecular weight: 436. Found: 436.

The structure of this product is believed to be:

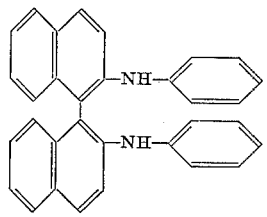

EXAMPLE 9

Dissolved in 600 milliliters of acetone were 21.9 grams (0.1 mole) of N-phenyl-2-naphthylamine and 16.9 grams (0.1 mole) of diphenylamine. The solution was maintained at 25° C. To this solution was added 10.6 grams (0.067 mole) of potassium permanganate. The temperature rose to 32° C. and a brown precipitate formed. The resulting mixture was stirred at room temperature for 24 hours and then filtered through a diatomaceous earth filter aid. A clear pale yellow filtrate was stripped to 80° C. at 0.2 mm. Hg. leaving 35.5 grams of a bright orange oil. This oil darkened on standing.

Low voltage mass spectra of the crude product indicated the following compositions:

|  | Percent |
|---|---|
| Unreacted diphenylamine (and tetraphenyl hydrazine) | 29.5 |
| Unreacted n-phenyl-2-naphthylamine | 14.7 |
| PBN dimer | 35.3 |
| Crossed dimer of PBN and diphenylamine | 15.3 |
| Side products | 5.2 |

Evaluation of products

The antioxidant properties of the novel compounds of this invention are measured by adding these compounds to a suitable oil and subjecting the oil to oxidation at high temperatures. The test is a bulk oil catalytic oxidation process in which a stream of dry air is passed through a heated sample of the lubricant compositions for 24 hours, at various elevated temperatures in the presence of iron, copper, aluminum and lead as catalysts. The metal samples consist of 15.6 sq. in of sand-blasted iron wire, 0.78 sq. in. of polished copper wire, 0.87 sq. in of polished aluminum wire, and 0.167 sq. in. of polished lead surface. The antioxidant activity is evaluated as the ability of the additive to control the acid number and viscosity of the oil and prevent them from rising at an unduly rapid rate. The sludge formation during the oxidation is estimated visually. The base stock is a mixed ester of pentaerythritol prepared by reacting an acid mixture of 1 mole of pelargonic acid and 3 moles of commercial valeric acid with 1 mole of technical grade pentaerythritol.

The results of this test are tabulated below. In Table I, the polymeric products of N-phenyl-1-naphthylamine are compared with the monomer. In Table II, the polymeric products of N-phenyl-2-naphthylamine are compared with the monomer.

TABLE I

| Additive | Conc. | 24 hrs. at 375° F. | | | 24 hrs. at 425° F. | | |
|---|---|---|---|---|---|---|---|
| | | Δ NN | Δ KV percent | Sludge | Δ NN | Δ KV percent | Sludge |
| None | | 7.9 | 265 | Nil | 5-9 | 390 | Nil. |
| N-phenyl-1-naphthylamine | 2 | 1.0 | 22 | Hvy-Lt | 0.5 | 29 | Trace-Hvy. |
| | 1 | 0.8 | 15 | Hvy-Lt | 1.0 | 24 | Lt-Hvy. |
| | 0.5 | 0.8 | 4 | Nil | 2.5 | 52 | Nil. |
| Example 1 | 2 | | | | 1.0 | 30 | |
| | 1 | | | | 1.5 | 22 | |
| | 0.5 | | | | 2.0 | 29 | |
| Example 3-a | 2 | 0.71 | 13.8 | Hvy | 0.94 | 24 | Trace. |
| | 1 | 0.45 | 10.0 | Hvy | 0.45 | 18 | Do. |
| | 0.5 | 0.70 | 10.9 | Nil | 0.71 | 20 | Nil. |
| Example 3-b | 2 | 0.23 | 8.0 | Nil | 0.23 | 23 | Med. |
| | 1 | 0.57 | 6.6 | Med | 0.30 | 18 | Med. |
| | 0.5 | 0.64 | 8.2 | Nil | 0.38 | 18 | Nil. |
| Example 3-c | 2 | 0.98 | 9.6 | Trace | 2.1 | 15 | Light. |
| | 1 | 0.95 | 9.0 | do | 0.45 | 16 | Med. |
| | 0.5 | 0.98 | 9.4 | Nil | 0.68 | 22 | Med. |

TABLE II

| Additive | Conc. | 24 hrs. at 375° F. | | | 24 hrs. at 425° F. | | |
|---|---|---|---|---|---|---|---|
| | | Δ NN | Δ KV percent | Sludge | Δ NN | Δ KV percent | Sludge |
| N-phenyl-1-2-naphthylamine | 2 | 0.3 | 7.0 | Med | 0.4 | 18 | Hvy. |
| | 1 | 0.4 | 5.5 | Nil | 0.7 | 13 | Hvy. |
| | 0.5 | 0.5 | 4.8 | Nil | 1.3 | 8 | Trace. |
| Example 8 | 2 | 0.58 | 6.4 | Med | 0.46 | 13 | Hvy. |
| Crude Product | 1 | 0.46 | 3.6 | Med | 0.71 | 20 | Hvy. |
| | 0.5 | 0.71 | −1.3 | Lt | 0.46 | 13 | Hvy. |
| Example 8 | 2 | 0.60 | 3.2 | Med | 0.75 | 11 | Hvy. |
| Crystalline dimer | 1 | 0.75 | 3.0 | Med | 0.73 | 9 | Hvy. |
| | 0.5 | 0.50 | −0.5 | Med | 0.73 | 12 | Hvy. |
| Example 9 | 2 | 0.49 | 10.6 | | 0.25 | 10.8 | |
| | 1 | 0.50 | 9.5 | | 0.50 | 16.1 | |
| | 0.5 | 0.74 | 9.4 | | 1.0 | 17.1 | |
| | 0.25 | 0.45 | 8.7 | | 3.0 | 122 | |

It is thus seen from the above results that the novel compounds of this invention successfully improve the oxidation stability of the synthetic ester lubricant. Moreover, it is noted that the greater the reaction conversion, that is the greater the proportion of polymer formed, the more improved the antioxidant properties are.

The lubricants of this invention may be used in the lubrication of automotive engines, diesel engines, aircraft gas turbine engines and other functions requiring a high stability fluid in which catalytic metals could normally hasten attack of oxidation. The grease-like products are also capable of being formulated into lubricant greases as well as being dissolved in liquids for oil compositions. Other additives may of course be employed along with the polymeric compounds, such as pour point depressors and viscosity index improvers.

The invention has been described with the aid of specific examples and procedures which have been used for illustrative purposes only. The invention also includes modifications thereof.

We claim:

1. An oil-soluble composition of matter comprising a reaction product obtained by the oxidation of an aromatic secondary naphthylamine selected from the group consisting of an N-aryl naphthylamine and an N-aryl naphthylamine in admixture with a diphenylamine, wherein said aryl is selected from the group consisting of phenyl and naphthyl, said oxidation being carried out by the step of treating the said aromatic secondary naphthylamine with an oxidizing agent at a temperature of from 150° to 300° C., thereby producing a reaction mixture containing components selected from the group consisting of dimers, trimers, and tetramers derived from the oxidation of the said aromatic secondary naphthylamine and mixtures thereof.

2. The composition of claim 1 wherein the aromatic secondary naphylamine is N-phenyl-1-naphthylamine.

3. The composition of claim 1 wherein the aromatic secondary naphthylamine is N-phenyl-2-naphthylamine.

4. The composition of claim 1 wherein the aromatic secondary naphthylamine is N-phenyl-2-naphthylamine in admixture with a diphenylamine.

5. The composition of claim 1 wherein the aromatic group is phenyl.

6. The composition of claim 1 prepared by heating the aromatic secondary naphthylamine at a temperature in the range of 150° to 300° C. in the presence of air.

7. The composition of claim 1 wherein the oxidizing agent is selected from the group consisting of potassium permanganate, lead dioxide, manganese dioxide, and hydrogen peroxide.

8. The composition of claim 1 wherein the oxidizing agent is potassium permanganate.

9. The composition of claim 1 prepared by heating an aromatic secondary naphthylamine at a temperature in the range of 150° to 300° C. in the presence of oxygen.

10. The composition of claim 1 wherein the reaction product contains at least one component having the structure selected from the group consisting of

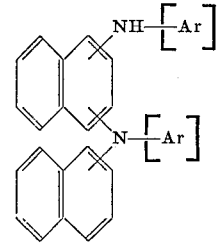

and

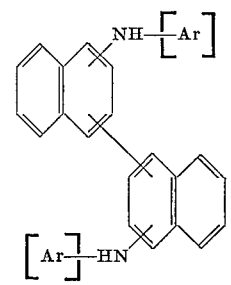

wherein Ar is selected from the group consisting of phenyl and naphthyl.

11. The composition of claim 1 wherein the reaction product contains at least one component having the structure selected from the group consisting of

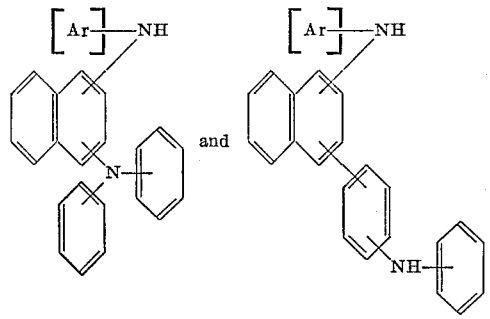

and wherein Ar is selected from the group consisting of phenyl and naphthyl.

12. As a composition of matter the compound

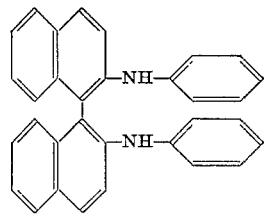

References Cited

UNITED STATES PATENTS 2,116,333   5/1938   Williams et al. _____ 260—576

OTHER REFERENCES

Lieber et al., J. Org. Chem., vol. 24, 1959, pp. 1775–1776.

Lieber et al., J. Org. Chem., vol. 25, 1960, pp. 196–198.

CHARLES B. PARKER, Primary Examiner

C. F. WARREN, Assistant Examiner

U.S. Cl. X.R.

252—50, 401; 260—45.9, 569

UNITED STATES PATENT OFFICE
CERTIFICATE OF CORRECTION

Patent No. 3,509,214            April 28, 1970

Milton Braid et al.

It is certified that error appears in the above identified patent and that said Letters Patent are hereby corrected as shown below:

In Table 2 bridging columns 7 and 8, "N-phenyl-1,2-naphthylamine" should read -- N-phenyl-2-naphthylamine --. In column 7, line 38, "polymer" should read -- polymers --.

Signed and sealed this 27th day of October 1970.

(SEAL)
Attest:

Edward M. Fletcher, Jr.
Attesting Officer

WILLIAM E. SCHUYLER, JR.
Commissioner of Patents